United States Patent
De Deken et al.

(10) Patent No.: US 10,723,648 B2
(45) Date of Patent: Jul. 28, 2020

(54) GLASS COMPOSITION FOR MICRO-D CONNECTOR SEALING

(71) Applicant: AXON CABLE, Montmirail (FR)

(72) Inventors: Leen De Deken, Montmirail (FR); Ning Yu, Villeneuve le Comte (FR); Christian Przybilla, Montmirail (FR)

(73) Assignee: AXON CABLE, Montmirail (FR)

( * ) Notice: Subject to any disclaimer, the term of this patent is extended or adjusted under 35 U.S.C. 154(b) by 314 days.

(21) Appl. No.: 15/573,724

(22) PCT Filed: May 19, 2016

(86) PCT No.: PCT/FR2016/051177
§ 371 (c)(1),
(2) Date: Nov. 13, 2017

(87) PCT Pub. No.: WO2016/189225
PCT Pub. Date: Dec. 1, 2016

(65) Prior Publication Data
US 2019/0337836 A1    Nov. 7, 2019

(30) Foreign Application Priority Data

May 22, 2015   (FR) .................................. 15 54634

(51) Int. Cl.
| | | |
|---|---|---|
| *C03C 3/12* | (2006.01) | |
| *C03C 27/04* | (2006.01) | |
| *C03C 8/24* | (2006.01) | |
| *H01R 13/52* | (2006.01) | |
| *H01R 43/00* | (2006.01) | |
| *H01R 13/03* | (2006.01) | |
| *H01R 13/405* | (2006.01) | |

(52) U.S. Cl.
CPC .............. *C03C 3/122* (2013.01); *C03C 3/127* (2013.01); *C03C 8/24* (2013.01); *C03C 27/044* (2013.01); *H01R 13/521* (2013.01); *H01R 13/5216* (2013.01); *H01R 43/005* (2013.01); *H01R 13/03* (2013.01); *H01R 13/405* (2013.01)

(58) Field of Classification Search
CPC ......... C03C 3/122; C03C 8/24; C03C 27/044; C03C 29/00
See application file for complete search history.

(56) References Cited

U.S. PATENT DOCUMENTS

| | | |
|---|---|---|
| 2,770,923 A | 11/1956 | Dalton et al. |
| 3,685,005 A | 8/1972 | Alessandro |
| 4,202,700 A | 5/1980 | Wilder, Jr. |
| 4,352,951 A | 10/1982 | Kyle |
| 4,652,536 A | 3/1987 | Nakajima et al. |
| 4,678,358 A | 7/1987 | Layher |
| 4,743,302 A | 5/1988 | Dumesnil et al. |
| 4,945,071 A | 7/1990 | Friesen et al. |
| 5,013,697 A | 5/1991 | Akhtar |
| 5,116,786 A | 5/1992 | Matsuura |
| 5,262,364 A | 11/1993 | Brow et al. |
| 5,284,706 A | 2/1994 | O'Donnelly |
| 5,965,469 A | 10/1999 | Kilgo et al. |
| 6,037,539 A | 3/2000 | Kilgo et al. |
| 6,413,891 B1 | 7/2002 | Cho et al. |
| 6,932,644 B1 | 8/2005 | Taylor |
| 2009/0018006 A1 | 1/2009 | Ueda et al. |
| 2014/0153165 A1 | 6/2014 | Hettler et al. |
| 2016/0190361 A1* | 6/2016 | Yan ................. H01L 31/022425 136/256 |
| 2016/0304391 A1* | 10/2016 | Eberhardt ............... C03C 3/122 |

FOREIGN PATENT DOCUMENTS

| | | |
|---|---|---|
| FR | 2642257 | 7/1990 |
| JP | 07330372 | 12/1995 |
| WO | 9310052 | 5/1993 |
| WO | 9314613 | 7/1993 |
| WO | 2008050819 | 5/2008 |
| WO | 2010126097 | 11/2012 |

OTHER PUBLICATIONS

International Search Report issued in International Application No. PCT/FR2016/051177 dated Aug. 31, 2016 (7 pages).
Written Opinion issued in International Application No. PCT/FR2016/051177 dated Aug. 31, 2016 (5 pages).

* cited by examiner

*Primary Examiner* — Elizabeth A. Bolden
(74) *Attorney, Agent, or Firm* — Hamre, Schumann, Mueller & Larson, P.C.

(57) ABSTRACT

The present invention relates to a tellurium-oxide-based glass composition for forming a glass-to-metal seal to alloys or metals having a coefficient of thermal expansion higher than 16 ppm/° C., said composition comprising $TeO_2$, ZnO, $TiO_2$ and optionally $K_2O$ and being essentially free of lead oxide, sodium oxide and vanadium oxide.
In addition it relates to the use of the glass composition according to the invention to form a glass-to-metal seal between copper or a copper alloy and an alloy or a metal having a coefficient of thermal expansion higher than 16 ppm/° C., in particular aluminum alloys.
It furthermore relates to a connector comprising a contact made of copper or of copper alloy, an insert and/or shell made of a metal or alloy having a coefficient of thermal expansion higher than 16 ppm/° C. and, by way of glass-to-metal sealant between the contact and the insert and/or shell, a tellurium-oxide-based glass having the composition according to the invention.
Lastly, it relates to a process for forming a glass-to-metal seal between a contact made of copper or of copper alloy and an insert and/or shell made of metal or alloy having a coefficient of thermal expansion higher than 16 ppm/° C.

20 Claims, 1 Drawing Sheet

GLASS COMPOSITION FOR MICRO-D CONNECTOR SEALING

The present invention relates to tellurium-oxide-based glass compositions for forming a glass-to-metal seal and to the use thereof in hermetic connectors such as hermetic micro-D connectors.

With the aim of decreasing the space required to interconnect electronic systems, connection-pin density is increasingly becoming a targeted performance criterion, this leading to miniaturization not only of the transmission cable, but also of the connector.

Figure 1:
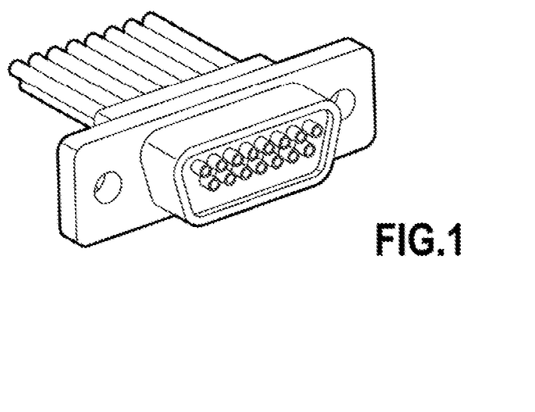
FIG. 1 shows an example of a 15-pin female micro-D connector according to the standard Mil-DTL-83513.

The standard Mil-DTL-83513 defines a family of rectangular male and female connectors the connecting portions of which are D-shaped. This family, called the micro-D family, is characterized by a pitch of 1.27 mm, this pitch representing the inter-axis distance between any 2 adjacent connecting pins. This standard also explicitly defines the number of connecting pins (or number of contacts) which is respectively 9, 15, 21, 25, 31, 37, 51 and 100. These contacts are placed in the connector in 2 or 3 rows, as illustrated in FIG. 1. Over the last few years the micro-D series of connectors has begun to become massively available on the market for electronic connectors.

The characteristics defined by the MIL-DTL-83513 standard (micro-D connection standard) that are required for this type of connector are:
- Insulation resistance between the contacts and between the contacts and the shell >5 Gohms at 500 Vdc;
- No failures after 5 thermal-shock cycles −55+125° C.;
- Resistance to vibrations: no discontinuity >1 µs at 50 g's;
- Resistance to mechanical shocks: no discontinuity >1 µs at 20 g's;
- Contact retention >2.26 kg.

Certain particular applications require these connectors to have specific properties. Two properties are increasingly demanded: hermeticity and non-magnetism.

Hermeticity, i.e. gas tightness, is defined by a leak rate. The acceptable leak rate must be determined for each application. To be acceptable, it is necessary for the leak to have no influence on operating pressure and/or the gases or vacuum present in the equipment.

Hermetic connectors are often used in electrical connections in pieces of vacuum equipment. In these systems, the lifetime of components is often related to the maintenance of the vacuum because these pieces of equipment are often sensitive (spectrometers, etc.). These connectors may also separate two compartments containing different gases that must not mix or that must not exit from the compartment.

Because of the increasingly high sensitivity of such equipment, the maximum leak rates required from these connectors are increasingly low. In order to be able to measure very low leak rates, i.e. below $1\times10^{-9}$ mbar·l/s, a helium leak detector is used. Helium is the smallest atom after hydrogen and exists in inert-gas form in the atmosphere at only 5 ppm.

The standard MIL-STD-883 is one of a number of standards specifying a method for measuring leak rate for electronic components. Under the test condition A4, the part is hermetically mated (using a gasket and suitable fixture and fittings) to a vacuum chamber. It is advantageous for the pressure in this chamber to be as low as possible to obtain the highest possible sensitivity.

Specifically, the lower the pressure, the lower the number of gas molecules and therefore the smaller the amount of residual helium in the chamber, this decreasing background noise. The standard requires a pressure lower than 0.13 mbar (0.1 torr). This chamber is connected to a calibrated mass spectrometer, in order to reach the expected helium leak rate. The mass spectrometer must be calibrated in each working shift, by virtue of a diffusion-type calibrated standard leak test. The seal-tightness of the fixture and fittings must be verified with a flat metal plate. To do this, the plate is sprayed with helium using a spray gun. If the detector does not detect helium during this verification, the fixture and fittings are correct and the parts may be tested in the same way, by spraying them with helium.

Non-magnetism represents a non-susceptibility to being magnetized in a magnetic field. This characteristic is measured according to the procedure defined in the standard GSFC-S-311, using a three-dimensional magnetometer.

To start with, the initial magnetic field is measured. Next, the part is magnetized with a field of 500 mT for 5 min using a magnet. A new measurement of residual magnetic field is taken. Lastly, a demagnetization phase is carried out by applying an alternating magnetic field of a strength higher than 500 mT. A measurement is once again taken.

Thus, the other characteristics desired for these connectors, due to the specific properties that it is sought to give them, are the following:
- A helium leak rate lower than $1\times10^{-9}$ mbar·l/s, or even lower than $1\times10^{-10}$ mbar·l/s;
- A residual field lower than 20 nT;
- An operating temperature able to reach as high as 200° C.

Moreover, it is increasingly important for the connector to meet the requirements of the restriction of hazardous substances (RoHS) directive. Given the gas permeability of plastics, glass is often used to form the insulation between the contacts and the shell of a hermetic connector. Forming a seal between one or more metal components using one or more glass parts is called glass-to-metal sealing.

To meet the requirements of the RoHS directive, the glass used for the glass-to-metal seal between the contacts and the shell of the connector must not contain lead oxide or any other compound the use of which is restricted by this directive.

The vast majority of hermetic micro-D connectors on the market are produced by combining alloys having low coefficients of thermal expansion, typically iron-nickel, iron-chromium or iron-nickel-chromium alloys, with borosilicate glasses or glass-ceramics. These various materials have coefficients of thermal expansion (CTEs) that are very close and quite low, of about 5 to 10 ppm/° C.

This allows these materials to expand and retract in the same way during temperature variations and the appearance of stresses in the glass to be avoided. This type of glass-to-metal seal is called a matched seal.

To form these glass-to-metal seals, the metals are often pretreated beforehand in order to guarantee a good bond between the materials. These pretreatments often involve removal of carbon impurities and pre-oxidation. Next, the glass, which most of the time takes the form of preforms, is held in contact with the metals by virtue of a tool and the temperature of the assembly is raised under a controlled atmosphere. The viscosity of the glass or of the glass-ceramic decreases and the latter bonds to the metals.

This solution has the drawback of using materials that are not only very magnetic but also not very conductive (ferrous materials). This greatly limits the maximum current able to flow through the contacts and also leads to signal deformation. Thus, the maximum current per contact in these connectors is 1 A, whereas in standard non-hermetic connectors using contacts made of copper alloys, the current rating is limited to 3 A.

Some hermetic solutions available on the market allow contacts made of much more conductive copper alloy to be used. Patents WO9314613 and U.S. Pat. No. 6,932,644 describe such connectors. In these two patents, a contact made of copper alloy is sealed to a stainless steel part. This metal part to which the contacts are sealed will be referred to as an "insert" below.

In order to allow a shell made of aluminum (or of titanium or even of another metal) to be used, these two patents employ a multimaterial sheet that is produced by explosive welding or by friction welding and that serves as a transition bushing between the metals. This sheet is composed of at least two intimately bonded metals. The two patents differ in the placement of this multimaterial part. In the first this sheet is used to produce the exterior shell of the connector. Stainless-to-stainless laser welding is used to join the stainless steel of the insert to the stainless steel of the shell, forming part of the multimaterial. The second patent claims to decrease weight and increase reliability by using this multimaterial sheet to produce the insert of the shell.

This sheet is machined so that the glass-to-metal seal is formed only to the stainless steel and so that the aluminum present on the back face of the insert can be laser welded to the exterior shell, which is also made of aluminum.

However, this solution requires the glass-to-metal seal of the contacts to be formed at a temperature below the melting point of aluminum because it is present in the oven in this step. In these two patents, the glass-to-metal seal is preferably formed with glass-ceramics (Kryoflex® and Ceramax®). The latter contain a non-negligible concentration of lead oxide (see U.S. Pat. No. 4,352,951).

These two solutions have the advantage of flexibility in terms of the choice of the material of the exterior shell of the connector: it is enough for the desired material to be able to be joined to stainless steel using one of the mentioned processes. However, many manufacturing steps are required to obtain a connector: production of the multimaterial sheet, machining steps, formation of the glass-to-metal seal, laser welding. This has a non-negligible impact on the final price of the connector. In addition, the use of stainless steel, even if it is austenitic (304L, 316L, etc.), implies a certain level of residual magnetism (of about one-hundred nanotesla). Another drawback is that a glass-ceramic based on lead oxide is used, i.e. one that does not meet the requirements of the RoHS directive.

Thus, to avoid the magnetism related to the use of stainless steel, it would seem to be advantageous to form the glass-to-metal seal directly to an aluminum shell. Furthermore, the advantage of using aluminum and its alloys to achieve the hermeticity is also due to their lightness and to their good thermal conductivity. Specifically, they may be used to produce shells containing heat-generating electronic components and the heat will be removed via the shell.

This avoids the need to use heatsinks. In addition, certain aluminum alloys may be laser welded, this being a very advantageous way of producing hermetic joints with a good reliability. Various glasses or glass-ceramics, often based on lead oxide (U.S. Pat. Nos. 4,202,700, 5,262,364, 6,037,539), have been developed for forming glass-to-metal seals to aluminum. Few compositions seem to have led to products on the market, except for the composition ALSG-32. This composition was developed by Prof. Brow and was commercialized by large glass manufacturers (Ferro, Schott, Elan, etc.). Glass-to-metal seals were formed with the glass ALSG-32 at the University of California, Davis and good withstands to thermal and mechanical shocks and vibrations were observed.

However, according to Prof. Brow himself, the design and geometry of the parts are both very important if successful formation of glass-to-metal seals is to be guaranteed. The difficulty consists in producing closely spaced glass-to-metal seals, i.e. with little aluminum between two glass/glass-ceramic preforms. This is required in micro-D connectors because the pitch is only 1.27 mm and contacts of 0.40 mm diameter are often used to guarantee a sufficient mechanical withstand. A small aluminum thickness means that the compressive stresses are exerted on small volumes at each end of this metal. Thus, there is more chance of exceeding the compressive elastic limit of aluminum in these zones, this leading to a plastic deformation of the metal. Thus, the compression on the glass may decrease drastically and lead to failures in the glass during increases in temperature. This is all the more true given that the sealing temperature of the glass ALSG-32 is very high (about 550° C.). Aluminum loses many of its mechanical properties after such a heat treatment and its elastic limit drops.

A few glass compositions without lead oxide have been produced for forming a glass-to-metal seal to aluminum (U.S. Pat. No. 4,202,700, FR2642257, U.S. Pat. No. 5,965,469) and a few processes have been developed (FR2642257). These are phosphate-based glasses and are known to have low sealing temperatures and high CTEs and thus would seem quite advantageous for forming a glass-to-metal seal to aluminum. In addition, their raw materials are commonplace and inexpensive.

However, experimentally, the inventors have observed that these glasses do not necessarily meet the requirements in terms of wettability and above all insulation resistance (comparative example 1). These glasses therefore do not allow parts with a leak rate lower than $1 \times 10^{-9}$ mbar·l/s to be obtained. These glasses also have a capacitive effect, due almost certainly to ionic conduction of the sodium ions for example.

Glasses based on tellurium oxide have been described in the prior art for the glass-to-metal sealing of semiconductor packages (U.S. Pat. Nos. 4,945,071, 4,743,302, 5,013,697, 5,116,786). However, these glasses contain lead oxide and thus do not meet the requirements of the RoHS directive.

Only patent application WO9310052 describes a tellurium-oxide-based glass without lead oxide. However, this glass is a binary system of tellurium oxide and vanadium oxide and therefore at no point is it suggested that it would be possible to remove the vanadium oxide from its composition. Furthermore such glasses are not commercially available. Moreover, this document nonetheless suggests adding lead oxide and merely indicates that this type of glass may be used to seal ceramic-based semiconductors. Thus, at no point is it suggested that this glass may be useful for forming a glass-to-metal seal to aluminum or aluminum alloys and there is even less of a suggestion that it may be useful in the case of micro-D connectors.

There is therefore a need to develop new glass compositions meeting the requirements of the RoHS directive and able to be used for glass-to-metal sealing of aluminum-based micro-D connector shells so as to obtain a hermetic and optionally non-magnetic connector.

The inventors have observed that it is surprisingly possible to use tellurium-oxide-based glasses without lead oxide or vanadium oxide for glass-to-metal sealing of contacts to a shell, in particular of micro-D type connectors, so as to obtain hermetic and optionally non-magnetic connectors meeting the requirements of the RoHS directive while using contacts made of copper or copper alloy.

The present invention therefore relates to a tellurium-oxide-based glass composition for forming a glass-to-metal seal to alloys or metals having a coefficient of thermal expansion higher than 16 ppm/° C., in particular higher than or equal to 16.5 ppm/° C. and more advantageously comprised between 16.5 ppm/° C. and 30 ppm/° C., said composition consisting of, in molar percent:

- between 60 and 80%, advantageously between 62 and 80%, even more advantageously between 64 and 79%, in particular between 64 and 70% and more particularly about 65% $TeO_2$;
- between 5 and 35%, advantageously between 10 and 34%, even more advantageously between 14 and 31%, in particular between 18 and 31% and more particularly between 20 and 30% ZnO;
- $TiO_2$ in an amount of at most 15%;
- between 0 and 30%, advantageously between 0 and 20% and more advantageously between 0 and 16% $K_2O$;
- and unavoidable impurities, said composition being essentially free and in particular completely free of lead oxide, sodium oxide and vanadium oxide.

In the context of the present invention, the expression "glass-to-metal seal" is understood to mean a seal formed between two metals or metal alloys by virtue of glass. This seal implies, in the case of connectors, a hermetic joint that allows electrical information to pass. Electrical insulation is therefore also implied.

In the context of the present invention, the expression "sealing temperature" is understood to mean the temperature to which it is necessary to heat the glass and metals to obtain the seal, i.e. to decrease the viscosity of the glass and create a joint between these materials.

Advantageously, these glasses contain no phosphates $P_2O_4$. Specifically, phosphates have a negative impact on the wettability of the glass.

In the context of the present invention, the expression "tellurium-oxide-based glass composition" is understood to mean any glass composition the main component of which is tellurium oxide ($TeO_2$) (amount higher than 60% in molar percent).

In one embodiment of the present invention, the alloy or metal having a coefficient of thermal expansion higher than 16 ppm/° C. is chosen from:

- aluminum and its alloys, advantageously aluminum-silicon, aluminum-magnesium or aluminum-magnesium-silicon alloys such as for example the (aluminum-silicon) alloys of the 4000 series, in particular the alloys 4047 and 4032, the (aluminum-magnesium) alloys of the 5000 series, in particular the alloys 5083 and 5754 and the (aluminum-magnesium-silicon) alloys of the 6000 series, in particular the alloy 6061;
- stainless steel, in particular 304L and 316L;
- copper and copper alloys optionally having undergone a surface treatment, in particular plating with nickel or plating with nickel and gold, and advantageously a copper-beryllium alloy such as the copper-beryllium alloy 33, also called C17300 (1.8% Be, 0.2% Co and at least 0.2% Pb for machinability) optionally having undergone a surface treatment, in particular plating with nickel or plating with nickel and gold.

In general, the coefficients of thermal expansion are, for:
the copper-beryllium alloy 33: 17.3 ppm/° C.;
the aluminum alloys:
  5083: 25.2 ppm/° C.
  5754: 24.6 ppm/° C.
  6061: 23.4 ppm/° C.
  4032: 20.2 ppm/° C.
  4047: 19 ppm/° C.
the stainless steel 304L: 17 ppm/° C.
the stainless steel 316L: 16.5 ppm/° C.

The coefficient of thermal expansion (CTE) is measured, in the context of the present invention, on a TA Instruments TMA (TMA 2940) with a ramp of 2°/min from 30 to 250° C.

The composition according to the present invention comprises ZnO.

The ZnO ensures the glass composition has a better stability, a slightly higher glass transition temperature Tg and a slightly lower CTE with respect to $K_2O$ alone.

The glass composition according to the present invention therefore comprises $TiO_2$ in an amount, in molar percent, of at most 15%, more advantageously comprised between 1 and 13%, even more advantageously comprised between 4 and 11%, in particular between 4 and 6%, and more particularly of 5%. Specifically the $TiO_2$ seems to confer an excellent durability on the glass.

In one particular embodiment, the glass composition according to the present invention furthermore comprises $K_2O$, advantageously in an amount, in molar percent, of at most 30%, advantageously comprised between 1 and 20%, more advantageously comprised between 4 and 16%, and in particular comprised between 5 and 15%. The $K_2O$ is advantageously added in partial substitution of the ZnO. Thus, advantageously, the amount of $K_2O+ZnO$ in the composition according to the present invention is comprised between 10 and 40%, more advantageously between 20 and 35%, and in particular between 25 and 35%, in molar percent. Specifically, the $K_2O$ increases the coefficient of thermal expansion of the glass and also seems to improve its wettability. It furthermore allows the glass transition temperature and therefore the sealing temperature of the glass composition according to the invention to be decreased. However, if it is used alone, without $TiO_2$, in a tellurium-oxide-based glass, the decrease in the glass transition temperature is too great as operating temperature is subject to a corresponding decrease.

Thus, in this embodiment, the glass composition according to the present invention comprises a mixture of $K_2O$ and $TiO_2$, advantageously containing an amount, in molar percent, of $TiO_2$ of at most 10% and of $K_2O$ of at most 20% and more advantageously an amount of $TiO_2$ comprised between 1 and 10% and an amount of $K_2O$ comprised between 1 and 20%.

In another advantageous embodiment, the glass composition according to the present invention does not contain $In_2O_3$, $Tm_2O_3$, $GeO_2$, $Bi_2O_3$, $K_2F_2$, $K_2Cl_2$, $K_2Br_2$, $Li_2O$ and/or $B_2O_3$.

In one advantageous embodiment, the glass composition according to the present invention has a coefficient of thermal expansion (CTE) comprised between 11 and 22 ppm/° C., advantageously between 11.5 and 19 ppm/° C., and more advantageously between 12 and 16 ppm/° C. In one advantageous embodiment, the glass composition according to the present invention has a CTE lower than that of the metal or metal alloy intended to be sealed with the glass-to-metal seal.

In another advantageous embodiment, the glass composition according to the present invention has a wetting angle smaller than 100°, advantageously comprised between 10° and 97°, and in particular between 18° and 96°, measured optically with a Nikkon camera (D5100, lens: AF-S Micro NIKKOR 40 mm f:2.8G) and the freeware software package imageJ.

A good wetting angle allows the presence of air between the glass and the metal or metal alloy to be avoided, this avoiding hermeticity problems.

In another advantageous embodiment, the glass composition according to the present invention has a glass transition temperature (Tg) below 500° C., advantageously comprised between 250 and 400° C., and in particular comprised between 300 and 350° C. A low glass transition temperature allows a glass-to-metal seal to be formed at lower temperature, this being useful for forming a glass-to-metal seal to aluminum alloys that have a low melting point.

Specifically, this avoids softening these alloys during the glass-to-metal sealing process. However, too low a glass transition temperature is disadvantageous in the context of the present invention because it is required to obtain a connector able to withstand temperatures of at least 200° C.

Tg is measured by virtue of a differential scanning calorimetry (DSC): Setaram DSC (DSC 131). This measurement is carried out from 20 to 580° C. with a ramp of 10° C./min. The temperatures Tg and Tx are onset temperatures (start of the transitions).

In another advantageous embodiment, the glass composition according to the present invention has a chemical durability comprised between $1\times10^{-5}$ and $1\times10^{-7}$ g/(cm$^2$·min) as determined in a soxhlet at 95° C. in continuously renewed demineralized water according to standard ISO16797.

Examples of glass compositions according to the present invention are collated in table 1 below:

TABLE 1

General data on glass compositions according to the invention

| Glass | Composition | Tg (° C.) | CTE (ppm/° C.) |
|---|---|---|---|
| 1 | $(TeO_2)_{70}(TiO_2)_{10}(ZnO)_{15}$ | 348 | 11.2 |
| 2 | $(TeO_2)_{65}(TiO_2)_{5}(ZnO)_{30}$ | 346 | 13.6 |
| 3 | $(TeO_2)_{65}(TiO_2)_{5}(ZnO)_{25}(K_2O)_{5}$ | 327 | 14.6 |
| 4 | $(TeO_2)_{65}(TiO_2)_{5}(ZnO)_{22}(K_2O)_{6.3}$ | 320 | 15.5 |
| 5 | $(TeO_2)_{65}(TiO_2)_{5}(ZnO)_{22}(K_2O)_{8}$ | 310 | 16 |
| 6 | $(TeO_2)_{65}(TiO_2)_{5}(ZnO)_{20}(K_2O)_{10}$ | 296 | 18.4 |
| 7 | $(TeO_2)_{65}(TiO_2)_{5}(ZnO)_{15}(K_2O)_{15}$ | 273 | 21.5 |

The present invention furthermore relates to the use of the glass composition according to the invention, in particular such as described above, to form a glass-to-metal seal between copper or a copper alloy, optionally having undergone a surface treatment (deposition of a surface metal layer), in particular plating with nickel or plating with nickel and gold, advantageously a copper-beryllium alloy, optionally having undergone a surface treatment, in particular plating with nickel or plating with nickel and gold, and an alloy or a metal having a coefficient of thermal expansion higher than 16 ppm/° C., in particular different from copper or from a copper alloy.

In the context of the present invention, the expression "copper or copper alloy plated with nickel" is understood to mean any copper or copper alloy having undergone a surface treatment so as to have a thin nickel layer deposited on its surface, in particular by electrolysis or by a chemical deposition process. This nickel layer in general also contains phosphorus, advantageously in an amount in molar percent comprised between 5 and 12% and, in particular, in order to make this layer non-magnetic, in an amount in molar percent comprised between 10.5 and 12%. The thickness of this layer is in general comprised between 1 and 20 µm, in particular between 1 and 15 µm and advantageously between 1 and 7 µm.

This layer may be completed with a gold layer. In the present invention, "copper or copper alloy plated with nickel and gold" is then spoken of. In this case, each layer advantageously has a thickness comprised between 1 and 10 µm and in particular between 1 and 7 µm.

In one advantageous embodiment, the alloy or metal having a coefficient of thermal expansion higher than 16 ppm/° C. is such as described above. In particular, the alloy or metal having a coefficient of thermal expansion higher than 16 ppm/° C. other than copper or than a copper alloy is chosen from aluminum and its alloys and stainless steel, and advantageously it is an aluminum alloy in particular chosen from an aluminum-silicon, aluminum-magnesium or aluminum-magnesium-silicon alloy, and more particularly an aluminum alloy such as described above.

In one particularly advantageous embodiment of the use according to the invention, the glass-to-metal seal is formed in a connector, advantageously a miniature connector, in particular a micro-D connector (according to the standard Mil-DTL-83513), between a contact made of copper or of copper alloy, in particular of a copper alloy such as a copper-beryllium alloy, optionally having undergone a surface treatment, in particular plating with nickel or plating with nickel and gold, and an insert and/or shell made of a metal or alloy having a coefficient of thermal expansion higher than 16 ppm/° C.

The present invention in addition relates to a connector comprising a contact made of copper or of copper alloy, optionally having undergone a surface treatment, in particular plating with nickel or plating with nickel and gold, advantageously made of a copper-beryllium alloy, optionally having undergone a surface treatment, in particular plating with nickel or plated with nickel and gold, an insert and/or shell made of a metal or alloy having a coefficient of thermal expansion higher than 16 ppm/° C., in particular other than copper or than a copper alloy, and a glass-to-metal sealant between the contact and the insert and/or shell, characterized in that the sealant is a tellurium-oxide-based glass having the composition according to the invention, in particular a composition such as described above.

Advantageously, the alloy or metal having a coefficient of thermal expansion higher than 16 ppm/° C. is such as described above.

In particular, the connector according to the invention is a miniature connector and more particularly a micro-D connector (according to the standard Mil-DTL-83513).

In one advantageous embodiment, the connector according to the invention is hermetic with a helium leak rate lower than $1\times10^{-9}$ mbar·l/s and advantageously lower than $3\times10^{-10}$ mbar·l/s as measured using a helium leak detector (Adixen ASM 142) according to the test condition A4 of the standard MIL-STD-883.

In another advantageous embodiment, the connector according to the invention has an insulation resistance between the contacts and between each contact and the insert and/or shell >5 Gohms, advantageously >10 Gohms and in particular >20 Gohms as measured at 500 Vdc using a megohmeter and in particular the Horizon II model HV4 cable test system.

In yet another advantageous embodiment, the connector according to the invention has an operating temperature able to reach as high as 200° C.

Advantageously, the copper alloy or copper of the contact is not plated with nickel and the alloy or metal having a coefficient of thermal expansion higher than 16 ppm/° C. is chosen from aluminum and its alloys. Advantageously, in this case, the connector according to the invention is non-magnetic with a residual magnetism <20 nT, measured according to the standard GSFC-S-311 using a three-dimensional MEDA FVM400 magnetometer.

The present invention lastly relates to a process for forming a glass-to-metal seal between a contact made of copper or of copper alloy, optionally having undergone a surface treatment, in particular plating with nickel or plating with nickel and gold, and an insert and/or shell made of metal or alloy having a coefficient of thermal expansion higher than 16 ppm/° C., in particular other than copper or than a copper alloy, comprising the following successive steps:

- a) providing a contact made of copper or of copper alloy, in particular made of a copper-beryllium alloy, optionally having undergone a surface treatment, in particular plating with nickel or plating with nickel and gold, and an insert and/or shell made of a metal or alloy having a coefficient of thermal expansion higher than 16 ppm/° C.;
- b) providing a preform, advantageously of cylindrical shape, of tellurium-oxide-based glass having the composition according to the present invention and in particular such as described above;
- c) bringing the preform into contact with the contact and with the insert and/or the shell;
- d) using a suitable tool, maintaining contact between the assembly made up of the contact, preform and insert and/or shell;
- e) heating the assembly made up of the contact, preform and insert and/or shell to a temperature and for a time sufficient to obtain the glass-to-metal seal;
- f) collecting the assembly thus sealed.

Advantageously, the alloy or metal having a coefficient of thermal expansion higher than 16 ppm/° C. is such as described above.

In one particular embodiment of the process according to the present invention, the temperature of step e) is comprised between 350 and 500° C., in particular between 400 and 500° C., and more particularly between 440 and 500° C.

In another embodiment of the process according to the present invention, the heating time of step e) is comprised between 15 minutes and 2 hours, and in particular between 30 minutes and 1 hour.

The heating in step e) may for example be carried out using an oven or inductively.

The invention will be better understood in light of the description of the figures and the examples that follow.

FIG. 2 shows, in cross section (FIG. 2A) and as seen from above (FIG. 2B), schematic views of a compression seal of a contact (1) in a shell (3) using glass (2) according to the invention.

EXAMPLE 1: GLASS-TO-METAL SEAL BETWEEN CONTACTS MADE OF COPPER ALLOY AND A SHELL MADE OF ALUMINUM ALLOY WITH GLASS COMPOSITIONS ACCORDING TO THE INVENTION

The Glasses the Composition of which is Indicated in Table 2 Below were Manufactured

TABLE 2

General data on 3 glass compositions according to the invention

| Glass | Composition | Tg (° C.) | CTE (ppm/° C.) | Durability (g/(min · cm$^2$)) |
|---|---|---|---|---|
| 2 | $(TeO_2)_{65}(TiO_2)_5(ZnO)_{30}$ | 346 | 13.6 | $1.97 \times 10^{-7}$ |
| 4 | $(TeO_2)_{65}(TiO_2)_5(ZnO)_{22}(K_2O)_{6.3}$ | 320 | 15.5 | $3.15 \times 10^{-7}$ |
| 5 | $(TeO_2)_{65}(TiO_2)_5(ZnO)_{22}(K_2O)_8$ | 310 | 16 | $2.5 \times 10^{-7}$ |
| 6 | $(TeO_2)_{65}(TiO_2)_5(ZnO)_{20}(K_2O)_{10}$ | 296 | 18.4 | |

The chemical-durability values were determined in a soxhlet at 95° C. in continually renewed demineralized water according to standard ISO16797.

This is an extremely critical test because the rate of dissolution remains at its maximum throughout the time (no saturation of water).

The glass-to-metal seals with these glass compositions were formed to shells made of aluminum alloy of the 4000, 5000 or 6000 family: 4047, 4032, 5083, 5754 or 6061.

The contact used was made of copper alloy: 33 type copper-beryllium alloy, also called C17300 (1.8% Be, 0.2% Co and at least 0.2% Pb for machinability). The glass was placed in the form of a cylindrical preform around each contact.

To form the glass-to-metal seals, the assembly made up of the metals and glass preforms was held in place using a suitable tool.

The heating was carried out in an oven, without a protective atmosphere, at the temperature and for the times indicated in table 3.

Figures 2A, 2B:
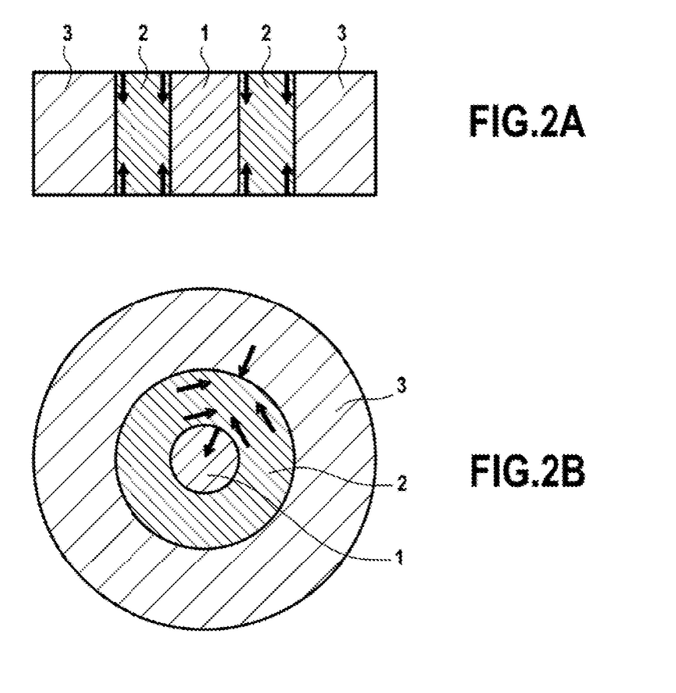

The glass-to-metal seal was formed by compression level with the shell as schematically shown in FIG. 2. The glass was thus compressed everywhere, except level with the contact where a radial extension occurs.

Insulation resistance was measured using a megohmeter under 500 Vdc. The insulation resistances obtained reached the detection limit of the apparatus (20 Gohms).

Hermeticity to helium was measured using a helium leak detector (Adixen ASM 142) according to the standard MIL-STD-883, under test condition A4. The measured leak rates were at the detection limit of the apparatus after a rapid measurement, i.e. after a measurement shorter than 1 minute ($3 \times 10^{-10}$ mbar·l/s).

To determine the wetting angle $\Theta$, the glass was deposited on an aluminum sheet and exposed in an oven to the temperature indicated for the time indicated in table 3 (same temperature and same time as for the glass-to-metal sealing process). The assembly made up of the glass and sheet was then removed from the oven, the glass setting immediately. The angle was then determined optically with a Nikkon camera (D5100, lens: AF-S Micro NIKKOR 40 mm f:2.8G) and the freeware software package imageJ.

Table 3 below shows the results obtained with these glasses.

TABLE 3

Experimental data obtained with the glasses according to the invention in the process according to example 1

| Glass | Time/temperature (min/° C.) of the sealing operation | Θ (°) | Hermeticity to helium (mbar · l/s) | Insulation resistance (Gohm) | Residual magnetism (nT) |
|---|---|---|---|---|---|
| 2 | 60/440 | 70-74 | $<3 \times 10^{-10}$ | >20 | <20 |
|   | 60/460 | 42-39 | | | |
| 4 | 30/480 | 98-103 | $<3 \times 10^{-10}$ | >20 | <20 |
|   | 30/500 | 49-50 | | | |
| 5 | 60/440 | 96-87 | $<3 \times 10^{-10}$ | >20 | <20 |
|   | 30/500 | 18-29 | | | |
| 6 | 60/440 | 41-39 | $<3 \times 10^{-10}$ | >20 | <20 |
|   | 30/500 | 21-28 | | | |
|   | 30/500 | 18-29 | | | |

The various glass-to-metal seals formed were then exposed to 5 thermal-shock cycles of −55° C.+125° C., with plateaus of 30 minutes in vertical shock climatic chambers, for example as sold under the trademark "Climats".

Hermeticity was once again measured: all the parts retained their hermeticity and the measured value was at the detection limit of the apparatus.

Five thermal shock cycles going from −55° C. to +200° C. were then carried out on the same parts. The measured hermeticity revealed that, once again, the parts had a leak rate lower than the detection limit of the apparatus.

These glasses are therefore suitable for the glass-to-metal sealing of connectors. It is thus possible to obtain, by virtue of these glasses, connectors, with contacts made of copper alloy, that are hermetic, non-magnetic, that meet the requirements of the RoHS directive and that have an operating temperature able to reach as high as 200° C.

EXAMPLE 2: GLASS-TO-METAL SEAL BETWEEN CONTACTS MADE OF A COPPER ALLOY PLATED WITH NICKEL OR PLATED WITH NICKEL AND GOLD AND A SHELL MADE OF ALUMINUM ALLOY WITH GLASS COMPOSITIONS ACCORDING TO THE INVENTION

Two glass compositions described in example 1 (glasses number 2 and 5) were used to form a glass-to-metal seal between a contact made of a copper-beryllium alloy plated with nickel or plated with nickel and gold and a shell made of aluminum alloy according to example 1. The process for forming a glass-to-metal seal and the measuring methods were identical to those of example 1.

Only the contact was different since various surface treatments were carried out on the contacts made of copper-beryllium alloy of example 1: contacts plated with nickel and plated with nickel and gold. In each and every case, chemical nickel (Ni) was used with various amounts of phosphorus (P). In the case of contacts plated with nickel and gold, gold (Au) alloyed with nickel was deposited by electrolysis after the deposition of nickel.

Table 4 below presents the results obtained with these glasses.

TABLE 4 experimental data obtained with the glasses according to the invention in the process according to example 2

| Glass | Surface treatment of the contact | Hermeticity to helium (mbar · l/s) | Insulation resistance (Gohm) | Residual magnetism (nT) |
|---|---|---|---|---|
| 5 | 6 μm Ni 11% P + 6 μm Au | $<3 \times 10^{-10}$ | >20 | >20 |
| 2 | 6 μm Ni 11% P + 6 μm Au | $<3 \times 10^{-10}$ | >20 | >20 |
| 2 | 3 μm Ni 6% P | $<3 \times 10^{-10}$ | >20 | >20 |
| 2 | 5 μm Ni 6% P | $<3 \times 10^{-10}$ | >20 | >20 |
| 2 | 10 μm Ni 11% P | $<3 \times 10^{-10}$ | >20 | >20 |

By virtue of these glasses, it is possible to obtain hermetic connectors that meet the requirements of the RoHS directive and that have contacts made of a copper alloy plated with nickel or plated with nickel and gold. However, these connectors are not non-magnetic, even if the contacts are to start with (if the percentage of phosphorus in the surface-treatment layer is higher than or equal to 10.5%).

EXAMPLE 3: GLASS-TO-METAL SEAL BETWEEN CONTACTS MADE OF A COPPER ALLOY AND A SHELL MADE OF STAINLESS STEEL WITH GLASS COMPOSITIONS ACCORDING TO THE INVENTION

One of the glass compositions described in example 1 (glass number 2) was used to form a glass-to-metal seal between a contact made of copper-beryllium alloy according to example 1 and a shell made of 304L and 316L stainless steel. The glass-to-metal sealing process and the measuring methods were identical to those of example 1. Only the shell was different since it was a shell made of stainless steel.

Table 5 below presents the results obtained with this glass.

TABLE 5 experimental data obtained with glasses according to the invention in the process according to example 3

| Glass | Hermeticity to helium (mbar · l/s) | Insulation resistance (Gohm) |
|---|---|---|
| 2 | $<3 \times 10^{-10}$ | >20 |

A glass-to-metal seal to stainless steel does not allow non-magnetic connectors to be obtained. However, the connectors obtained with the glass composition according to the invention were hermetic.

It is therefore possible to produce hermetic micro-D connectors having a stainless steel shell and contacts made of copper alloy with a glass containing no lead oxide.

COMPARATIVE EXAMPLE 1: PHOSPHATE GLASSES 5 phosphate-glass compositions were tested for sealing contacts made of copper-beryllium alloy to a shell made of aluminum alloy. Phosphate glasses are generally known for their high degree of water absorption. The compositions were therefore optimized to improve their durability via the presence of acid oxides such as $Al_2O_3$, which create $AlPO_4$ groups that reinforce the glass network, or the addition of amphoteric compounds such as $Nb_2O_5$.

The glasses the composition of which is indicated in table 6 below were therefore manufactured.

TABLE 6

General data on 5 phosphate-glass compositions

| Glasses | Composition | Tg (° C.) | CTE (ppm/° C.) | Durability (g/cm² · min) |
|---|---|---|---|---|
| 11 | $(NaPO_3)_{36}(KPO_3)_{36}(Ba(PO_3)_2)_{12})(Al_2O_3)_8(Al(PO_3)_3)_8$ | 380 | 15 | $1.23 \times 10^{-6}$ |
| 12 | $(NaPO_3)_{35}(KPO_3)_{35}(Ca_2(P_2O_7)_2)_{10}(Al_2O_3)_{3.65}(Al(PO_3)_3)_{1.65}(ZnO)_{15}$ | 380 | 14.2 | $1.68 \times 10^{-6}$ |
| 14 | $(NaPO_3)_{37.5}(KPO_3)_{37.5}(Ba(PO_3)_2)_{12.5})(Nb_2O_5)_{12.5}$ | 381 | 16.8 | $1.28 \times 10^{-5}$ |
| 32 | $(NaPO_3)_{35}(KPO_3)_{35}(Ca_2(P_2O_7)_2)_{10}(Al_2O_3)_{3.65}(Al(PO_3)_3)_{1.65}(ZnF_2)_{15}$ | 360 | 13 | — |
| 34 | $(NaPO_3)_{35}(KPO_3)_{35}(Ca_2(P_2O_7)_2)_{10}(Al_2O_3)_{3.65}(Al(PO_3)_3)_{1.65}(ZnF_2)_{10}(CuF_2)_5$ | 362 | 12.9 | — |

For the glass-to-metal seals, the metals and the process used were the same as in example 1. The heating was carried out in an oven under atmosphere, but other methods of heating could have been envisioned for forming the glass-to-metal seal.

The measuring methods were identical to those of example 1.

Table 7 below presents the results obtained with these glasses.

TABLE 7

Experimental data obtained with phosphate glasses

| Glasses | Time (min)/ Temperature (° C.) of the sealing operation | Θ (°) | Hermeticity to helium (mbar · l/s) | Insulation resistance (Gohm) | Residual magnetism (nT) |
|---|---|---|---|---|---|
| 11 | — | — | $9.5 \times 10^{-6}$- $5.2 \times 10^{-8}$ | 0.3-14 | <20 |
| 12 | 60/500 | 104-108 | $4 \times 10^{-4}$- $4 \times 10^{-9}$ | 0.2-0.5 | <20 |
| 14 | — | — | $>10^{-5}$ | 1.2-2.2 | <20 |
| 32 | 60/480 | 115 | $1.3 \times 10^{-5}$ | 2 | <20 |
| 34 | 60/500 | 113-117 | $4 \times 10^{-5}$ | 0.1 | <20 |

These glasses are therefore unsuitable for meeting the requirements in terms of wettability and above all in terms of insulation resistance.

Specifically, the measured wetting angles and the glass-to-metal seals formed demonstrated an evident lack of wettability to the aluminum. It has been observed that even if the temperature and time in the oven were increased, the wettabilities of these glasses did not improve.

These glasses therefore did not allow parts with a leak rate lower than $1 \times 10^{-9}$ mbar·l/s to be obtained.

In addition, insulation resistance varied from trial to trial, certainly because of the varying amount of air between the glass and the aluminum. These glasses also exhibited a capacitive effect, very certainly due to ionic conduction, due to sodium ions for example.

COMPARATIVE EXAMPLE 2: CHALCOGENIDE GLASSES

Three chalcogenide glasses were synthesized because, according to the literature, they had Tgs and CTEs that meant they could have met the requirements.

Their properties are presented in table 8 below.

TABLE 8

General data on 3 chalcogenide-glass compositions

| Glass | Composition | Tg (° C.) | CTE (ppm/° C.) |
|---|---|---|---|
| 20 | $Ge_{25}Sb_{10}S_{65}$ + 10% CsCl | 260 | about 20 |
| 22 | $Ge_{26}Sb_{10}S_{24}$ | 340 | about 16 |
| 26 | $15Ga_2S_3$—$75GeS_2$—$10CsCl$ | 370 | about 20 |

These glasses were abandoned after wettability trials because they required the glass-to-metal seal to be formed under a controlled atmosphere to prevent their oxidation.

COMPARATIVE EXAMPLE 3: ALKALI GLASSES

An alkali glass containing no lead oxide, which was sold commercially under the name Msoft 5 by Mansol Preforms, was tested in the context of formation of a glass-to-metal seal between copper alloys and a shell made of aluminum alloy.

Its properties are presented in table 9 below.

TABLE 9

General data on the composition of the alkali glass

| Trade name | Type of glass | CTE (ppm/° C.) | Sealing temperature (° C.) |
|---|---|---|---|
| Msoft 5 | Alkali glass | 16.0 | 560-600 |

To form the glass-to-metal seals, the same process as that in example 1 was used for 1 hour and with a temperature of 570° C.—only the tested glass was changed. However, it was not possible to produce parts the leak rate of which was measurable with the alloys 4000 and 5083. The latter have a quite low melting point and their surface deformed and oxidized enormously during the formation of the glass-to-metal seal. Their surface was therefore no longer smooth enough to ensure a uniform compression of the gasket and a hermetic fixture. The measuring methods were identical to those of example 1.

Table 10 below presents the results obtained with this glass.

TABLEAU 10

Experimental data obtained with an alkali glass

| Contact | Helium leak rate (mbar · l/s) | Insulation resistance (Gohm) | Residual magnetism (nT) |
|---|---|---|---|
| Unplated contact | <3 × 10$^{-10}$ | 0.2-0.5 | <20 |
| Contact plated with nickel (10 μm Ni 11% P) | <3 × 10$^{-10}$ | 0.3-1 | >20 |

The helium leak rate obtained with the various connectors was below the detection limit of the measuring apparatus after a rapid measurement, i.e. after a measurement shorter than 1 minute. In contrast, the measured insulation resistance was much lower than that desired. A capacitive effect was observed, i.e. the resistance was observed to increase with the application time of the voltage, as during the charging of a capacitor. This is typical of ionic conduction. The glass being alkali-based, it is highly probable that small alkali-metal ions, such as sodium ions, are responsible for this conduction.

Specifically, these ions being small, they may easily move through the glass if the iono-covalent bonds binding them to the rest of the glass network have too low an energy with respect to the attraction of the applied negative voltage.

Thus, during the application of the voltage, Na$^+$ ions move toward the negative electrode. The resistance was therefore very low to start with. However, it then gradually increased as ions reached this pole. On a polarity inversion, this effect recommenced.

To increase insulation resistance, trials were carried out in which the surface of the contact was pre-oxidized (see table 11 below). Specifically, forming an oxide layer adds an insulating layer between the contact and the glass, this being liable to increase insulation resistance.

TABLE 11

Experimental data obtained with an alkali glass and a pre-oxidized contact

| Contact (time and temperature of the pre-oxidation) | Helium leak rate (mbar · l/s) | Insulation resistance (Gohm) | Residual magnetism (nT) |
|---|---|---|---|
| Unplated pre-oxidized contact (200° C./5 min) | <3 × 10$^{-10}$ | 1-2 | <20 |
| Contact plated with nickel then pre-oxidized (530° C./10 min) | <3 × 10$^{-10}$ | 1-22 | >20 |

Unfortunately, insulation resistance varied greatly from trial to trial. Two explanations may be given for this observation. Firstly, the thicknesses of oxide created are perhaps not always the same, and, during the formation of the glass-to-metal seal, the oxide may dissolve in the glass. Thus, if the oxide is not thick enough in places, it is possible to end up with oxide-free zones after the formation of the glass-to-metal seal. Secondly, when the contact is being handled in order to be placed in the tool, oxide may be removed. Specifically, all that is required for this insulating layer to be removed locally is for a scratch to scratch off the oxide.

Obtaining a sufficient insulation resistance is therefore not something that is easy and it is risky to rely solely on oxide to guarantee it. This alkali glass can therefore not be used in the targeted application.

The invention claimed is:

1. A tellurium-oxide-based glass composition for forming a glass-to-metal seal to alloys or metals, wherein the alloy or metal has a coefficient of thermal expansion higher than 16 ppm/° C., said composition consisting of, in molar percent:
   60-80% of TeO$_2$;
   5-35% of ZnO;
   TiO$_2$ in an amount of at most 15%;
   0-30% of K$_2$O;
   and unavoidable impurities,
said composition being essentially free of lead oxide, sodium oxide and vanadium oxide.

2. The glass composition as claimed in claim 1, which comprises TiO$_2$ in an amount in molar percent of 1-13%.

3. The glass composition as claimed in claim 1, which comprises K$_2$O in an amount in molar percent of at most 30%.

4. The glass composition as claimed in claim 3, which comprises K$_2$O in an amount in molar percent of 1-20%.

5. The glass composition as claimed in claim 1, which consists of, in molar percent:
   64-79% of TeO$_2$;
   14-31% of ZnO;
   TiO$_2$ in an amount of at most 15%;
   0-20% of K$_2$O;
   and unavoidable impurities.

6. The glass composition as claimed in claim 1, wherein the coefficient of thermal expansion of the glass is in a range of 11-22 ppm/° C.

7. The glass composition as claimed in claim 1, wherein the alloy or metal having a coefficient of thermal expansion higher than 16 ppm/° C. is chosen from the group consisting of aluminum and its alloys, stainless steel, copper and copper alloys.

8. The glass composition as claimed in claim 7, wherein the alloy or metal having a coefficient of thermal expansion higher than 16 ppm/° C. is chosen from the group consisting of aluminum-silicon, aluminum-magnesium or aluminum-magnesium-silicon alloy.

9. The glass composition as claimed in claim 7, wherein the alloy or metal having a coefficient of thermal expansion higher than 16 ppm/° C. is a copper-beryllium alloy.

10. The glass composition as claimed in claim 9, wherein the copper-beryllium alloy is plated with nickel or plated with nickel and gold.

11. A glass-to-metal sealant between copper or a copper alloy, and an alloy or a metal having a coefficient of thermal expansion higher than 16 ppm/° C. made from the glass composition as claimed in claim 1.

12. The glass-to-metal sealant as claimed in claim 11, wherein the alloy or metal having a coefficient of thermal expansion higher than 16 ppm/° C. is other than copper or than a copper alloy and is chosen from the group consisting of aluminum and its alloys and stainless steel.

13. The glass-to-metal sealant as claimed in claim 11, which is formed in a connector, between a contact made of copper or of copper alloy and an insert and/or shell made of an alloy or metal having a coefficient of thermal expansion higher than 16 ppm/° C.

14. A connector comprising a contact made of copper or of copper alloy, an insert and/or shell made of a metal or alloy having a coefficient of thermal expansion higher than 16 ppm/° C. and a glass-to-metal sealant between the contact and the insert and/or shell, wherein the sealant is a tellurium-oxide-based glass having the composition such as defined in claim 1.

15. The connector as claimed in claim 14, characterized in that the alloy or metal having a coefficient of thermal expansion higher than 16 ppm/° C. is chosen from the group consisting of aluminum and its alloys and stainless steel.

16. The connector as claimed in claim 14, wherein the copper alloy or copper of the contact is not plated with nickel, wherein the alloy or metal having a coefficient of thermal expansion higher than 16 ppm/° C. is chosen from the group consisting of aluminum and its alloys and wherein the connector is non-magnetic with a residual magnetism <20 nT.

17. The connector as claimed in claim 14, which is a micro-D connector.

18. The connector as claimed in claim 14, which is hermetic with a helium leak rate lower than $3\times10^{-10}$ mbar·l/s, has an insulation resistance between the contacts and between each contact and the insert and/or shell >5 Gohm and an operating temperature able to reach as high as 200° C.

19. A process for forming a glass-to-metal seal between a contact made of copper or of copper alloy, and an insert and/or shell made of a metal or alloy having a coefficient of thermal expansion higher than 16 ppm/° C., comprising the following successive steps:
 a) providing a contact made of copper or of copper alloy, and an insert and/or shell made of a metal or alloy having a coefficient of thermal expansion higher than 16 ppm/° C.;
 b) providing a preform of tellurium-oxide-based glass having the composition as defined in claim 1;
 c) bringing the preform into contact with the contact and with the insert and/or the shell;
 d) using a suitable tool, maintaining contact between the assembly made up of the contact, preform and insert and/or shell;
 e) heating the assembly made up of the contact, preform and insert and/or shell to a temperature and for a time sufficient to obtain the glass-to-metal seal;
 f) collecting the assembly thus sealed.

20. The process as claimed in claim 19, characterized in that the temperature of step e) is in a range of 350-500° C.

* * * * *